Dec. 19, 1944. P. G. COOK 2,365,523
DEVICE FOR SEALING BAGS
Filed Oct. 11, 1941 2 Sheets-Sheet 2

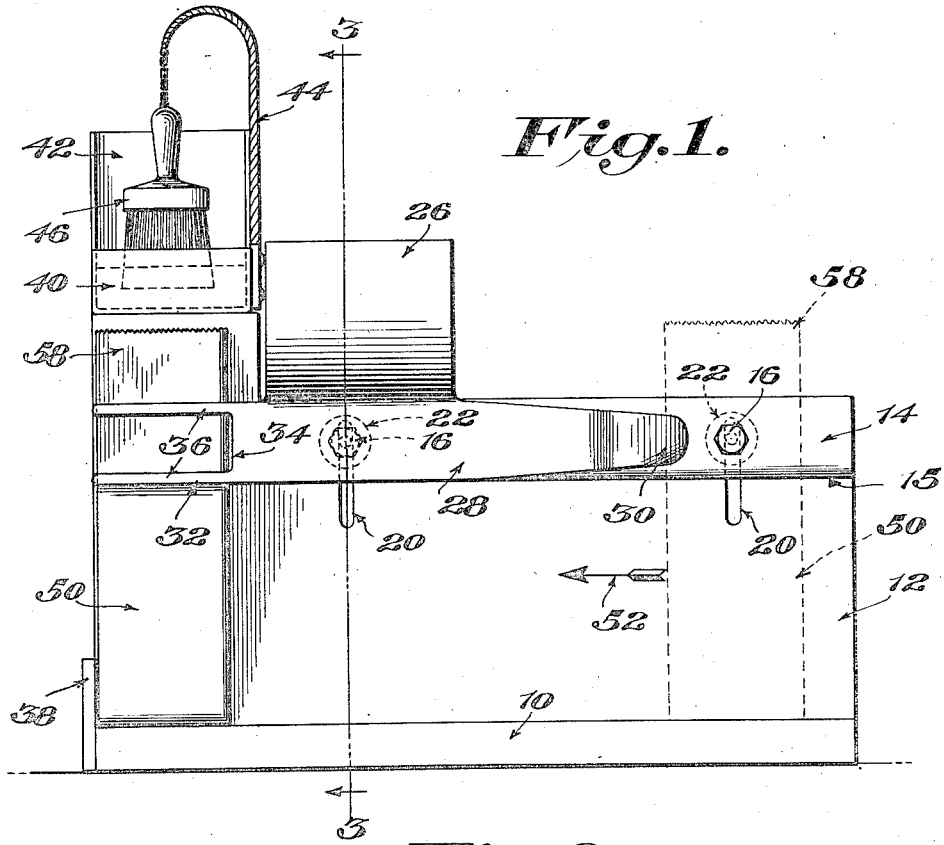
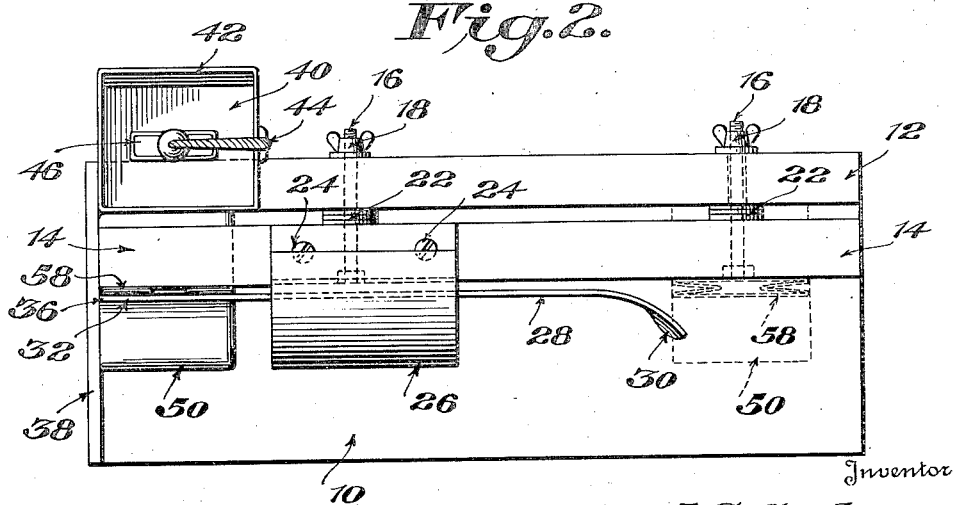

Inventor
Paul G. Cook,
By Ross C. Hurrey
Attorney

Patented Dec. 19, 1944

2,365,523

UNITED STATES PATENT OFFICE 2,365,523

DEVICE FOR SEALING BAGS

Paul G. Cook, Chicago, Ill., assignor to Union Bag & Paper Corporation, New York, N. Y., a corporation of New Jersey Application October 11, 1941, Serial No. 414,670

12 Claims. (Cl. 93—6)

It is an object of this invention to provide a method of closing and sealing filled bags which may be carried out expeditiously through the use of extremely cheap and simple equipment.

It is a further object of this invention to provide a device in the nature of a tool which is without moving parts and by means of which my improved method may be practiced.

These and other objects will be made clear in the following description taken in connection with the annexed drawings, in which:

Fig. 1 is a view of my device in front elevation;

Fig. 2 is a plan view corresponding to Fig. 1;

Figure 3:
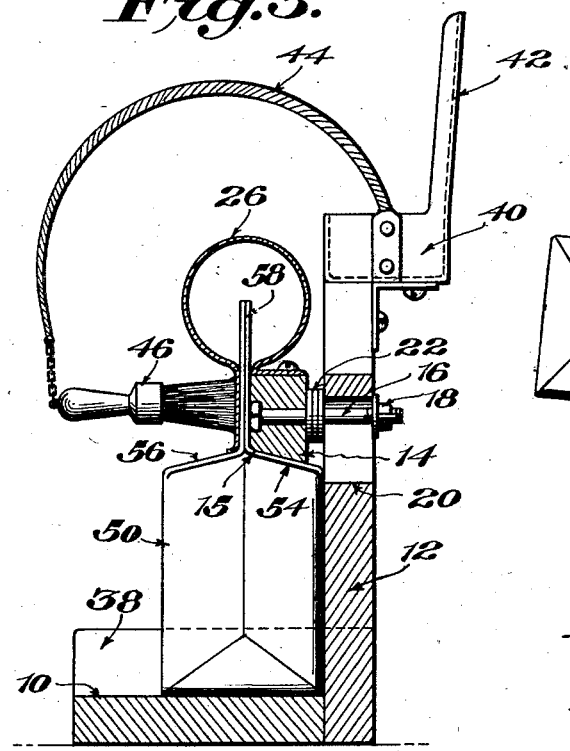
Fig. 3 is a section on the line 3—3 of Fig. 1.

The essential difference between a machine and a tool lies in the fact that a tool properly so-called should not require the application of power and should, so far as possible, be free of moving parts. There are a great many machines for closing and sealing filled bags, but even the simplest of these have sufficient moving parts to make them heavy and expensive. There is, accordingly, a considerable problem in the introduction of paper bags to new fields if one must persuade the prospective purchaser to invest several thousand dollars in machinery before being completely convinced that the new form of package will be acceptable to his own customers. At the same time it is slow, costly work to close paper bags entirely by hand with sufficient uniformity to insure consumer acceptance, especially if the closure be at all complicated.

I have devised a method whereby a satisfactory closure may be made substantially by hand but with great uniformity and have also devised a tool whereby the operator may practice the method rapidly and with a high degree of uniformity.

The primary purpose of both the method and the device is to provide means whereby a paper package may be introduced and its consumer acceptance determined without the necessity of a heavy preliminary investment in machinery.

My tool or device comprises a bag supporting table 10 at the rear side of which is secured a vertical bag guiding wall 12. At the upper side of the bag guiding wall 12 is mounted a horizontal guide 14. The horizontal guide 14 is secured to the vertical wall 12 by means of bolts 16 and wing nuts 18 which pass through elongated slots 20 in the vertical wall 12. The horizontal guide 14 is adjustably spaced from the vertical wall 12 by shims 22 which surround the bolts 16. It is clear therefore that the horizontal guide 14 may be adjusted vertically relative to the table 10 and horizontally relative to the vertical wall 12. The lower forward edge 15 of the horizontal guide 14 is rounded to minimize the possibility of difficulty in inserting a filled bag into place.

Secured to the horizontal guide 14 by means of screws 24 is a member 26, the lower part of which is in the form of an elongated strip 28 which, with the front wall of the horizontal guide 14, forms a channel adapted snugly to receive the collapsed mouth of a filled bag. The leading end 30 of the member 26 is curved away from the horizontal guide 14 to facilitate entrance of the bag mouth. If desired, but by no means necessary, the opposite end 32 of the member 28 may be cut away as indicated at 34 to form fingers 36.

The vertical depth of the channel, or at least, of the trailing end 32 of the member 28, must not exceed the depth of the gussets of the collapsed mouth of the filled bag to be sealed. This limitation is of importance, however only for a length of the member 28 at the trailing end 32 equal to the width of the bag to be sealed. The permissible thickness of the member 28, at least adjacent the trailing end 32, is severely limited, and must not be sufficient to cause the formation of a loose fold. In particular, the upper edge of the trailing end must be sufficiently narrow to facilitate the formation of a permanent crease in the bag mouth. It should not, however, be sharp enough to cut the bag material. As a matter of practice, both edges will be of the same thickness, since the end 32 will be formed of sheet metal of only sufficient thickness to obtain the requisite mechanical strength.

At the end of the table 10 adjacent the trailing end of the strip 28 is a stop 38 and there is mounted on the vertical wall 12 adjacent the trailing end thereof a paste pot 40 which has at its rear side a splash wall 42. A flexible column 44 is mounted at one side of the paste pot 40 and supports a brush 46 in such a position that the brush is normally located within the paste pot 40.

My method of sealing filled bags will now be described with reference to my preferred device. It is, however, to be understood that the method is not dependent upon the use of the particular tool shown in the drawings, which tool is to be considered a preferred embodiment.

Figure 5:
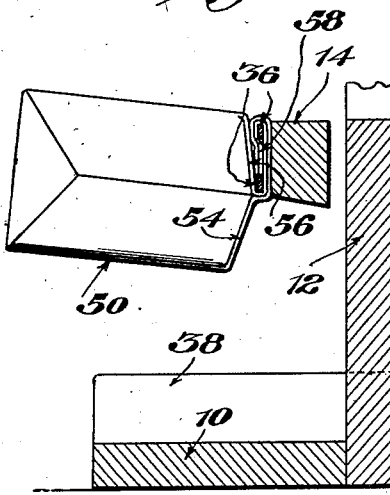
Fig. 5 illustrates the completion of the step illustrated in Fig. 4.

An operator receiving a filled bag 50 will collapse the mouth of the bag to the condition indicated in Figs. 2 and 3 with the gussets tucked in so that the width of the collapsed mouth is equal to the width of the filled body of the bag. When in this condition, the bag is brought to bear against the vertical wall 12 and is thrust in the direction of the arrow 52 in Fig. 1 so as to bring the collapsed mouth into the channel formed between the horizontal guide 14 and the member 28. The lower surface of the horizontal guide 14 bears against the rearward shoulder 54 of the filled bag 50. This surface is slightly inclined to conform to the normal contour of the filled bags. The bag is moved until it bears against the stop 33, at which time approximately half of the collapsed mouth of the bag projects above the upper edge of the member 28, and the lower edge of the member 28 bears against the level of the contents of the bag. The operator then grasps the brush 46 and applies paste to the forward shoulder 56 of the bag and, if desired, to the portion of the collapsed mouth lying between the fingers 36 formed at the trailing end of the member 28. The operator then releases the brush which is returned to the paste pot 40 by the flexible column 44, and simultaneously the operator folds the portion of the collapsed mouth lying above the upper edge of the member 28 about such edge to bring the bag mouth into the condition illustrated in Fig. 4. The body of the bag is then rotated about the lower edge of the member 28 until the shoulder 66 presses against the folded-over portion 58 of the collapsed bag mouth. This condition is best illustrated in Fig. 5. With the bag in the condition illustrated in Fig. 5, the operator slides the bag clear of the member 28 and deposits the bag, mouth down, on any suitable receiving table. The paste is thus enabled to set while held under the pressure of the bag's weight.

Figure 4:
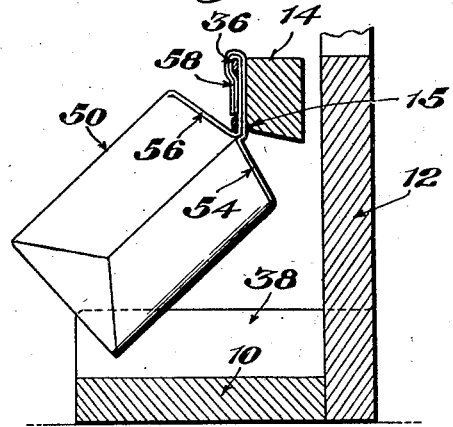
Fig. 4 illustrates an intermediate step in my process as carried out on my device.
Figure 6:
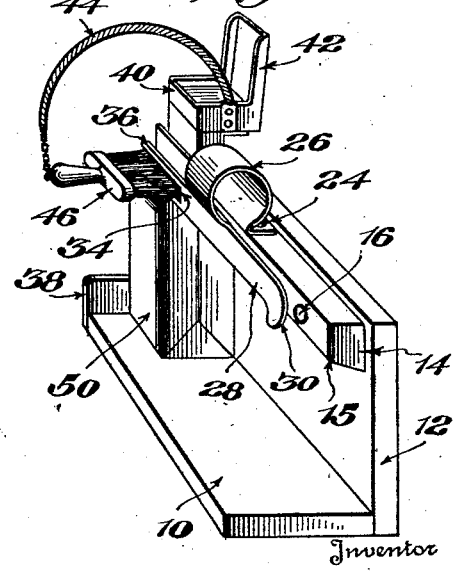
Fig. 6 is a perspective view showing the general disposition of the parts under the conditions shown in Fig. 3.

While it is possible to alter the above described sequence of steps by folding the portion 58 of the collapsed mouth to the condition shown in Fig. 4 and applying paste to it before bringing the parts to the condition shown in Fig. 5, this is less desirable since it necessitates the operator getting paste on his hands in order to hold the portion 58 of the bag mouth in position during the pasting operation.

It is further to be noted that, while some benefit results from the cutting away of the member 28 between the fingers 36 and the application of paste to the bag mouth in that area, this is by no means indispensable and such a step is not to be construed as a limitation of the claims unless expressly set forth therein.

In the subjoined claims, the sequence in which the steps may be recited is not to be construed as a limitation to that particular sequence except by the express terms of the claims.

What is claimed is:

1. A device of the class described comprising a filled bag supporting table; a pair of opposed walls forming a channel above said table and adapted to receive snugly the collapsed mouth of a filled bag supported on said table, at least one of said walls having a thin bottom edge adapted to permit a filled bag to be rotated thereabout to form a crease between the lower part of the collapsed mouth of the bag and the top of the filled portion of the bag; said channel having a vertical depth less than the length of the collapsed portion of the filled bag to be sealed; the lower edge of said channel being at a height from said table substantially equal to the length of the filled portion of the bag to be sealed and one wall of said channel having thin creasing edges on both the upper and lower margins thereof.

2. A device of the class described comprising a filled bag supporting table; a pair of opposed walls forming a channel above said table and adapted to receive snugly the collapsed mouth of a filled bag supported on said table, at least one of said walls having a thin bottom edge adapted to permit a filled bag to be rotated thereabout to form a crease between the lower part of the collapsed mouth of the bag and the top of the filled portion of the bag; said channel having a vertical depth less than the length of the collapsed portion of the filled bag to be sealed; the lower edge of said channel being at a height from said table substantially equal to the length of the filled portion of the bag to be sealed and one wall of said channel comprising a thin flat elongated plate having creasing edges on both the longitudinal margins thereof.

3. A device of the class described comprising a filled bag supporting table; a pair of opposed walls forming a channel above said table and adapted to receive snugly the collapsed mouth of a filled bag supported on said table, at least one of said walls having a thin bottom edge adapted to permit a filled bag to be rotated thereabout to form a crease between the lower part of the collapsed mouth of the bag and the top of the filled portion of the bag; said channel having a vertical depth less than the length of the collapsed portion of the filled bag to be sealed; the lower edge of said channel being at a height from said table substantially equal to the length of the filled portion of the bag to be sealed and one wall of said channel comprising a thin flat plate having creasing edges on both longitudinal margins thereof.

4. A device of the class described comprising a filled bag supporting table; a pair of opposed walls forming a channel above said table and adapted to receive snugly the collapsed mouth of a filled bag supported on said table, at least one of said walls having a thin bottom edge adapted to permit a filled bag to be rotated thereabout to form a crease between the lower part of the collapsed mouth of the bag and the top of the filled portion of the bag; said channel having a vertical depth less than the length of the collapsed portion of the filled bag to be sealed; the lower edge of said channel being at a height from said table substantially equal to the length of the filled portion of the bag to be sealed and one wall of said channel comprising a thin flat plate disposed in a plane substantially at right angles to the surface of said supporting table and having creasing edges on the longitudinal margins thereof.

5. A device of the class described comprising a filled bag supporting table; a pair of opposed walls forming a channel above said table and adapted to receive snugly the collapsed mouth of a filled bag supported on said table; said channel having a vertical depth less than the length of the collapsed portion of the filled bag to be sealed; the lower edge of said channel being at a height from said table substantially equal to the length of the filled portion of the bag to be sealed and one wall of said channel comprising a flat plate having a pair of fingers at one end thereof forming a gap therebetween.

6. A device of the class described comprising a filled bag supporting table; a pair of opposed walls forming a channel above said table and adapted to receive snugly the collapsed mouth of a filled bag supported on said table; said channel having a vertical depth less than the length of the collapsed portion of the filled bag to be sealed; the lower edge of said channel being at a height from said table substantially equal to the length of the filled portion of the bag to be sealed and one wall of said channel comprising a thin flat plate forming creasing edges on opposite longitudinal margins and having a gap therebetween near one end thereof.

7. A device of the class described comprising a filled bag supporting table; a pair of opposed walls forming a channel above said table and adapted to receive snugly the collapsed mouth of a filled bag supported on said table, at least one of said walls having a thin bottom edge adapted to permit a filled bag to be rotated thereabout to form a crease between the lower part of the collapsed mouth of the bag and the top of the filled portion of the bag; said channel having a vertical depth less than the length of the collapsed portion of the filled bag to be sealed; the lower edge of said channel being at a height from said table substantially equal to the length of the filled portion of the bag to be sealed and means adapted to guide a filled bag to bring its collapsed mouth into said channel.

8. A device of the class described comprising a filled bag supporting table; a pair of opposed walls forming a channel above said table and adapted to receive snugly the collapsed mouth of a filled bag supported on said table, at least one of said walls having a thin bottom edge adapted to permit a filled bag to be rotated thereabout to form a crease between the lower part of the collapsed mouth of the bag and the top of the filled portion of the bag; said channel having a vertical depth less than the length of the collapsed portion of the filled bag to be sealed; the lower edge of said channel being at a height from said table substantially equal to the length of the filled portion of the bag to be sealed and a stop adjacent said table for locating the filled bag relative to the length of said channel.

9. A device of the class described comprising a filled bag supporting table; a pair of opposed walls forming a channel above said table and adapted to receive snugly the collapsed mouth of a filled bag supported on said table, at least one of said walls having a thin bottom edge adapted to permit a filled bag to be rotated thereabout to form a crease between the lower part of the collapsed mouth of the bag and the top of the filled portion of the bag; said channel having a vertical depth less than the length of the collapsed portion of the filled bag to be sealed; the lower edge of said channel being at a height from said table substantially equal to the length of the filled portion of the bag to be sealed; and means for adjusting the vertical position of said channel relative to said table.

10. A device of the class described comprising a filled bag supporting table; a pair of opposed walls forming a channel above said table and adapted to receive snugly the collapsed mouth of a filled bag supported on said table, at least one of said walls having a thin bottom edge adapted to permit a filled bag to be rotated thereabout to form a crease between the lower part of the collapsed mouth of the bag and the top of the filled portion of the bag; said channel having a vertical depth less than the length of the collapsed portion of the filled bag to be sealed; the lower edge of said channel being at a height from said table substantially equal to the length of the filled portion of the bag to be sealed and means to adjust the horizontal spacing of said channel and said table.

11. A device of the class described comprising a filled bag supporting table; a pair of opposed walls forming a channel above said table and adapted to receive snugly the collapsed mouth of a filled bag supported on said table, at least one of said walls having a thin bottom edge adapted to permit a filled bag to be rotated thereabout to form a crease between the lower part of the collapsed mouth of the bag and the top of the filled portion of the bag; said channel having a vertical depth less than the length of the collapsed portion of the filled bag to be sealed; the lower edge of said channel being at a height from said table substantially equal to the length of the filled portion of the bag to be sealed; means adapted to guide a filled bag to bring its collapsed mouth into said channel and a stop adjacent said table for locating the filled bag relative to the length of said channel.

12. A device of the class described comprising a filled bag supporting table; a pair of opposed walls forming a channel above said table and adapted to receive snugly the collapsed mouth of a filled bag supported on said table, at least one of said walls having a thin bottom edge adapted to permit a filled bag to be rotated thereabout to form a crease between the lower part of the collapsed mouth of the bag and the top of the filled portion of the bag; said channel having a vertical depth less than the length of the collapsed portion of the filled bag to be sealed; the lower edge of said channel being at a height from said table substantially equal to the length of the filled portion of the bag to be sealed; means for adjusting the vertical position of said channel relative to said table and means to adjust the horizontal spacing of said channel and said table.

PAUL G. COOK.